United States Patent [19]

Castleberry

[11] 4,233,603
[45] Nov. 11, 1980

[54] MULTIPLEXED VARISTOR-CONTROLLED LIQUID CRYSTAL DISPLAY

[75] Inventor: Donald E. Castleberry, Schenectady, N.Y.

[73] Assignee: General Electric Company, Schenectady, N.Y.

[21] Appl. No.: 961,223

[22] Filed: Nov. 16, 1978

[51] Int. Cl.² ............................................. G06F 3/14
[52] U.S. Cl. ................................. 340/783; 340/784; 340/811; 350/333; 340/718
[58] Field of Search ............... 340/765, 784, 811, 783, 340/718; 350/333, 332

[56] References Cited

U.S. PATENT DOCUMENTS

| | | | |
|---|---|---|---|
| 3,073,992 | 1/1963 | Wolfe | 350/333 |
| 3,603,984 | 9/1971 | Heilmeier et al. | 340/784 |
| 3,725,899 | 4/1973 | Greubel | 340/784 |
| 3,781,862 | 12/1973 | Yamamura | 350/332 |
| 3,967,253 | 6/1976 | Tsuruishi | 340/784 |
| 3,967,265 | 6/1976 | Jacob | 340/784 |
| 4,028,692 | 6/1977 | Ngo | 340/784 |
| 4,062,626 | 12/1977 | Kawakami et al. | 340/784 |
| 4,070,663 | 1/1978 | Kanatani et al. | 340/784 |
| 4,103,297 | 7/1978 | McGreivy et al. | 340/784 |

*Primary Examiner*—Marshall M. Curtis
*Attorney, Agent, or Firm*—Geoffrey H. Krauss; Marvin Snyder; James C. Davis

[57] ABSTRACT

Liquid crystal displays allowing high order multiplexing, typically with a multiplexing order N of about 1,000, utilize a thin sheet of a varistor material to provide a high degree of non-linearity in the optical response of the display with respect to the multiplexed driving voltage for each cell of the display.

44 Claims, 15 Drawing Figures

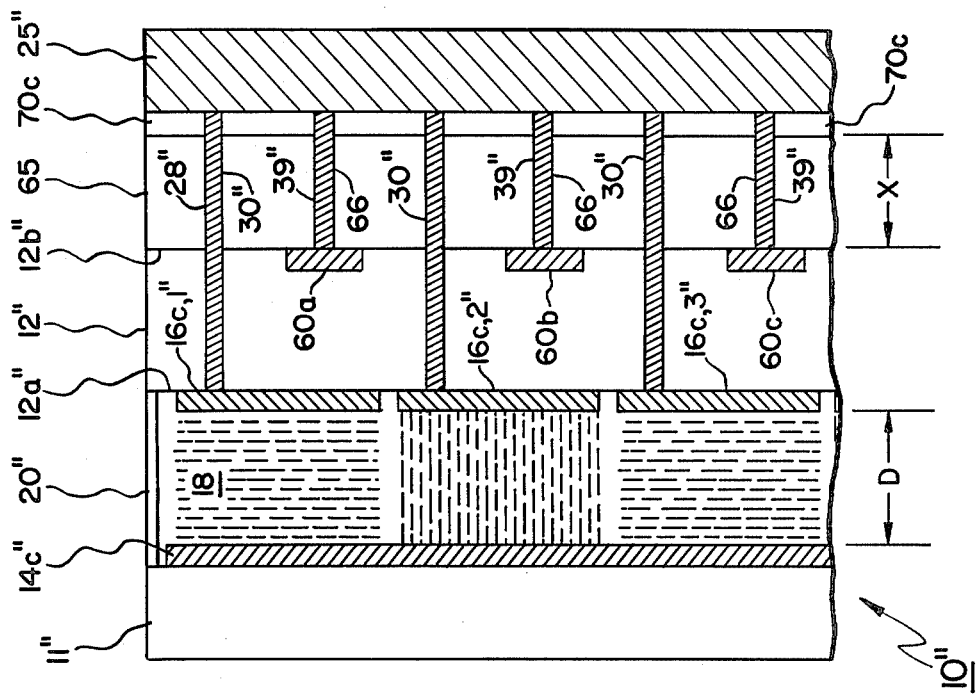
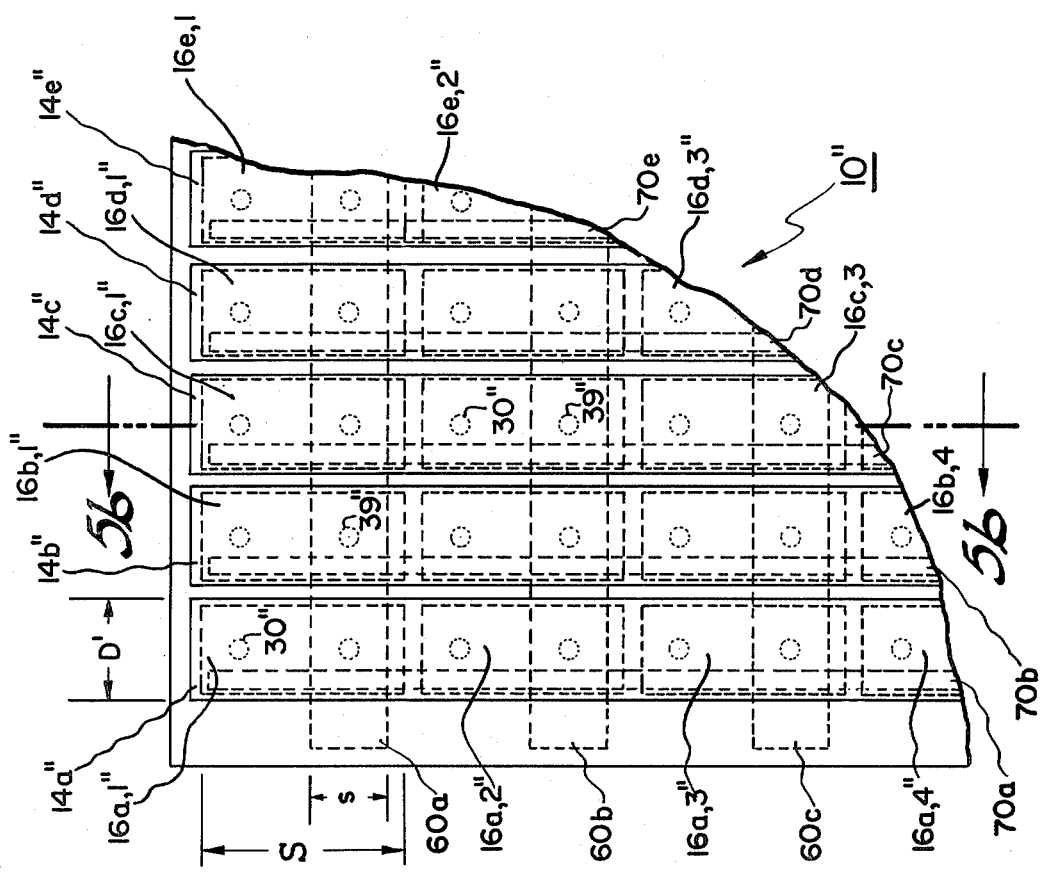

MULTIPLEXED VARISTOR-CONTROLLED LIQUID CRYSTAL DISPLAY

BACKGROUND OF THE INVENTION

The present invention relates to multiplexed data displays and, more particularly, to a novel multiplexed liquid crystal display utilizing varistor material for control of a multiplicity of display cells.

It is well known that reflective liquid crystal display technology is attractive for fabricating displays of the flat panel type, due to the extremely low power consumption, versatility of format and viewability of the display over a wide range of ambient light conditions. Liquid crystal displays have, however, been characterized by their inability to be multiplexed at a high multiplexing order N. The intrinsic non-linearity in the optical response versus the voltage characteristics of the basic liquid crystal effects has hitherto allowed limited multiplexing, to a multiplexing order N of about ten or, equivalently, with a duty factor $D=(1/N)$ of about 0.1. Thus, groups of up to ten display elements can be multiplexed by activating a particular element for one unit of time in every ten time units, with the intrinsic non-linearity of the liquid crystal material layer itself providing sufficient storage to operate that one display cell for the remaining 90% of the time between energization pulses. Due to this relatively low degree of multiplexing capability, the use of multiplexed liquid crystal displays has generally been limited to displays having a relatively small amount of information content, such as may be found in watches and calculators. For displays with a large amount of information content, such as large matrix displays having a large number of elements, it is known that an external non-linear device should be used to control each display element. Suggested approaches to supply external non-linear control devices has been to provide arrays of thin film transistors or silicon transistors upon a silicon backplate, upon one wall of the display, with one of the transistors associated with each of a multiplicity of display cells forming the entire display member. This approach has been generally unsatisfactory due to serious problems in yield and cost. Accordingly, a large area liquid crystal display providing a high order of multiplexing, typically with $100 \leq N \leq 1,000$, is desirable.

BRIEF SUMMARY OF THE INVENTION

In accordance with the invention, a multiplexed varistor-controlled liquid crystal display, having a high order of multiplexing capability, includes an unstructured slab of varistor material utilized to form the rear wall of a liquid crystal cell. The varistor, which may be of the metal-oxide type, is preferably formed of a sintered mixture of zinc oxide (ZnO) powder into which small amounts of other metal oxides, such as bismuthoxide ($Bi_2O_3$) and manganese oxide ($MnO_2$) have been added to provide a control device having sufficient non-linearity to make high order multiplexing possible.

In one preferred embodiment, the liquid crystal display is of the reflective type and utilizes a cholesteric-nematic liquid crystal host having dissolved therein a guest dichroic dye, for formation of a bright, attractive large area and high resolution reflective matrix display. Various electrode placement embodiments are possible, each causing the varistor device to be placed in series with each liquid crystal cell of the display. In one particularly preferred embodiment, an additional matrix of varistor-capacitor series elements is utilized to further decode the row and/or column drives to a two-dimensional varistor-controlled liquid crystal display, for further reduction of the number of lead connections required to the display apparatus.

Accordingly, it is an object of the present invention to provide novel varistor-controlled liquid crystal displays having a high order of multiplexing capability.

This and other objects of the present invention will become apparent upon consideration of the following detailed description, when taken in conjunction with the drawings.

BRIEF DESCRIPTION OF THE DRAWINGS

FIG. 1b is a sectional sideview, taken along lines 1b–1b of the display embodiment to FIG. 1a;

FIG. 3b is a graphical set of waveforms utilized to drive the display matrix of FIG. 3a;

FIG. 3d is an alternate preferred set of drive waveforms for the matrix display of FIG. 3a;

FIG. 4b is a sectional sideview, along line 4b—4b, of the display embodiment of FIG. 4a;

FIG. 5a is a front plan view of a portion of still another presently preferred embodiment of varistor-controlled multiplexed matrix display;

FIG. 5b is a sideview, taken along lines 5b—5b, of the portion of the display in FIG. 5a.

DETAILED DESCRIPTION OF THE INVENTION

Figure 1A:
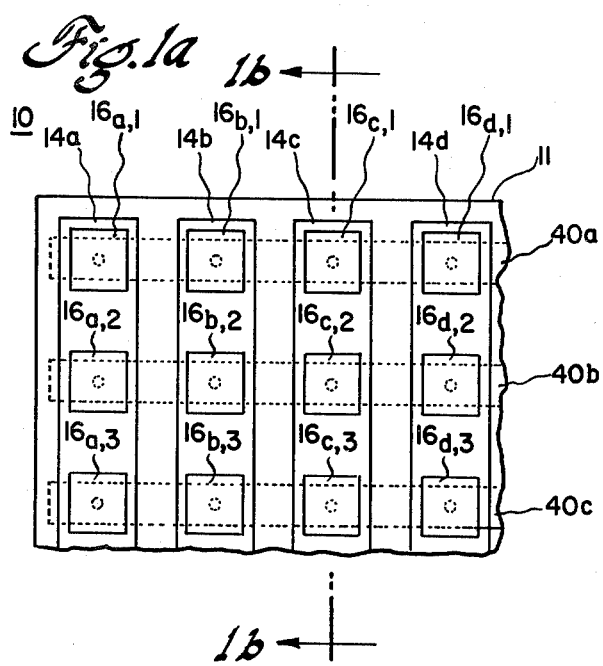
FIG. 1a is a plan view of a portion of a multiplexed varistor-controlled liquid crystal display, in accordance with the principles of the present invention.
Figure 1B:
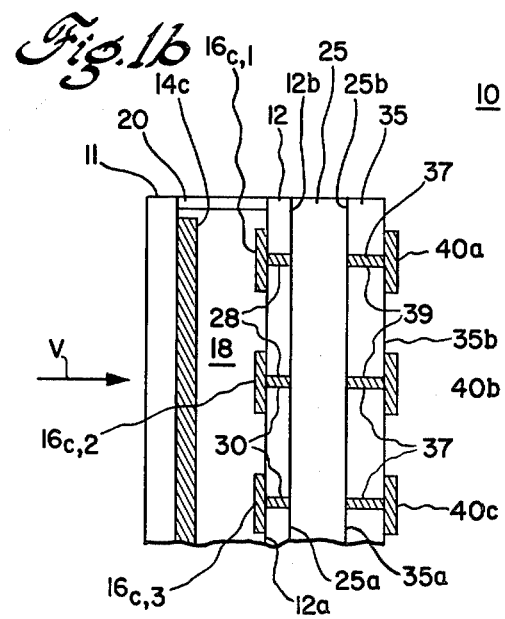

Referring initially to FIGS. 1a and 1b, a first embodiment of a multiplexed varistor-controlled reflective liquid crystal matrix display 10 includes a substantially transparent front substrate 11, formed of glass, plastic and the like materials. A second substrate 12, formed of insulative material, is placed behind front substrate 11 with the facing surfaces of the substrates arranged in substantially parallel, spaced-apart fashion. Advantageously, second substrate 12 has a thickness of at least 25 microns. A plurality of vertically-disposed column electrodes 14a–14d are fabricated upon the interior surface of front substrate 11, in a portion of the display as illustrated. The number of column electrodes is determined by the total number of display columns required to achieve desired resolution over a selected display area. Column electrodes 14 are fabricated of a conductive and substantially transparent material, such as Indium Tin Oxide, and the like. A multiplicity of rear cell electrodes $16_{a,1}$–$16_{d,3}$ are fabricated upon the interior facing surface of the illustrated portion of rear substrate 12, in manner such as to be essentially insulated from each other and positioned parallel to one another in a two-dimensional matrix with a plurality of the rear cell electrodes, e.g. electrodes $16_{a,1}$–$16_{a,3}$, substantially evenly spaced along a line in registration with each column electrode, e.g. column electrode 14a. The parallel rows of rear cell electrodes $16_{a,n}$–$16_{d,n}$ (where $1 \leq n \leq 3$ in the illustrated portion) are disposed substantially transverse to the elongated dimensions of column electrodes 14a–14d upon the interior surface of front substrate 11, whereby a two-dimensional matrix of display cells, each having a shape defined by the rear cell electrode shape and each isolated from the others, is formed by the overlap of a selected one of rear cell electrodes $16_{a,1}$–$16_{d,3}$ with a selected column electrode 14a–14d, when viewed from beyond front substrate 11 and looking, in the direction of arrow V, therethrough sequentially through the substantially transparent column electrodes toward the rear cell electrodes. Each of the rear cell electrodes has a highly reflective front surface, substantially parallel to and facing front substrate 11, when viewed from the front of the display. The area of each display cell is thus delineated by the smaller dimension of the rear cell electrode or the associated column electrode. A square shape may be chosen for the rear cell electrode to maximize cell area.

A layer 18 of liquid crystal material fills the volume between column electrodes 14a–14d and their supportive front substrate 11, and rear cell electrodes $16_{a,1}$–$16_{d,3}$ and their supportive rear substrate 12; a suitable sealer means 20 is utilized about the periphery of the display to maintain liquid crystal material 18 in place. An unstructured slab 25 of a varistor material is positioned upon the surface 12b of the rear substrate, opposite the surface 12a upon which the rear cell electrodes are fabricated. The thickness of the slab of varistor material is selected to determine the breakdown voltage thereof, as further discussed hereinbelow. Suitable apertures 28 are formed through the thickness of rear substrate 12 at a matrix of positions, each within the area defined by one of the two-dimensional array of rear cell electrodes in registration with an associated column electrode. A conductive lead 30, such as a metallic pin and the like, is positioned within each aperture 28 to connect each conductive rear cell electrode to the surface 25a of the varistor slab in abutment with rear substrate surface 12b at one of a matrix of positions thereon defined in registration with the overlying display cells, themselves defined by the registration of any one of the column electrodes and each one of the row (real cell) electrodes. Another insulative substrate 35, having a thickness of at least 25 microns, is positioned in abutment with varistor slab rear surface 25b and also includes a matrix of apertures 37 formed therethrough, each substantially in registration with an associated one of apertures 28 formed through rear substrate 12, and each having a conductive lead 39 positioned therein. A plurality of conductive scan electrodes 40a–40c are each disposed horizontally upon the outwardly facing surface 35b of the rearmost substrate 35 and behind and parallel to a plurality of associated rear cell electrodes. Thus, scan electrode 40a is behind all of the top row of rear cell electrodes $16_{a,1}$–$16_{d,1}$ and is in electrical connection with the plurality of connective leads 39 associated with the row of display elements formed by this row of rear cell electrodes.

Thus, light entering the front of the display, in the direction of arrow V, passes through substantially transparent front substrate 11 and the vertically-disposed column electrodes 14. The light may be absorbed in liquid crystal material 18 to provide a dark display matrix cell, or may, if a suitable field is provided between a front column electrode and a rear cell electrode associated with a particular matrix cell, be transmitted substantially unattenuated through the liquid crystal material to be reflected from the front surface of the rear cell electrode and then again pass in substantially unattenuated manner through the liquid crystal layer, column electrode and front substrate to provide a bright matrix area when observed by a viewer looking at the front substrate, in the direction of arrow V. Each matrix cell is energized in multiplex fashion for one unit of time and then remains in the driven condition, either absorbing or reflecting light, for an additional time period, equalled on the order of one hundred to one thousand times as long as the driven interval, due to energy storage in the liquid crystal layer capacitance $C_{lc}$, while additional display cells of the matrix are sequentially driven. Thus, in a multiplex matrix display having one hundred column electrodes 14 and one hundred scan electrodes 40, with each scan electrode coupled through the varistor slab to a row of one hundred individual rear cell electrodes 16, the ten thousand matrix elements of the display are sequentially energized in multiplex fashion by energizing each column electrode sequentially for one hundred units of time, and then deenergizing each column electrode for the remaining 9,900 units of time, while the scan electrodes are sequentially energized, if a reflective area is required, for one unit of time, in multiplexing manner as known to the art for two-dimensional multiplex matrices.

Figure 2A:
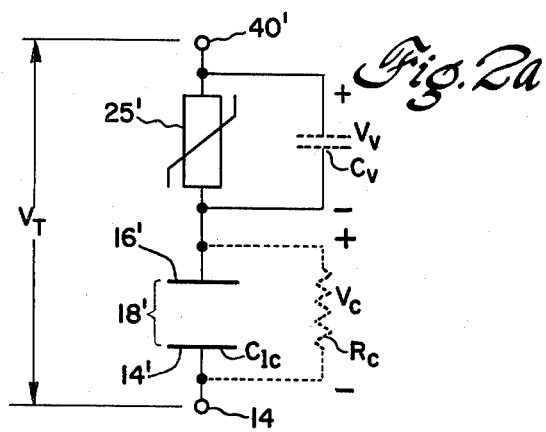
FIG. 2a is a schematic representation of the equivalence circuit of each of the multiplicity of display cells in the display matrix of the display of FIG. 1, and illustrating principles of operation of the invention.
Figure 2B:
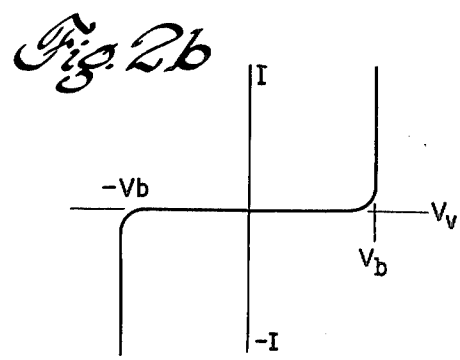
FIGS. 2b–2d are graphical illustrations useful in understanding operation of each display element.
Figure 2C:
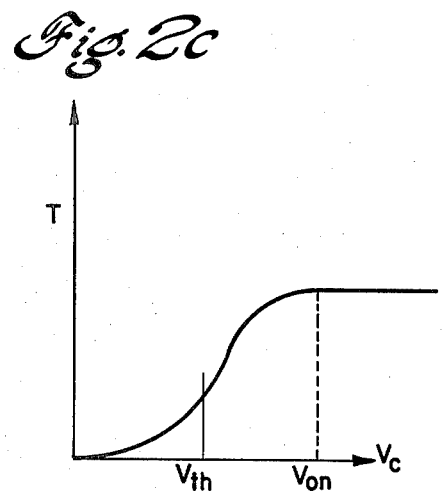
Figure 2D:
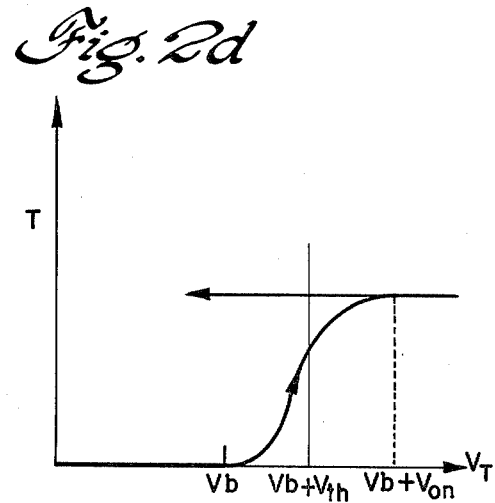

Referring now to FIGS. 2a–2d, the "memory" or storage mechanism allowing multiplexing orders N between about one hundred and one thousand, is illustrated. In FIG. 2a, a typical cell of the display is shown in schematic fashion. Each display cell includes a nonlinear element formed of a varistor 25' (being that portion of varistor layer 25, of FIG. 1b, between a set of conductive leads 30 and 39 in registration), which nonlinear varistor element 25' is connected between a first (scan) electrode 40' and to one electrode (a rear cell electrode) 16' of a liquid crystal display cell 18'. The liquid crystal display cell also includes a front electrode 14' connected to another terminal 14 which is one of column electrodes 14a–14d (FIG. 1a). Thus, there is a varistor device 25', typically fabricated of sintered zinc oxide (ZnO) and the like materials, in electrical series connection with each display cell 18'. The varistor exhibits threshold-like conduction similar to a pair of back-to-back zener diodes and is additionally characterized by having a parasitic capacitance $C_V$ thereacross. The liquid crystal display cell behaves as an electrical capacitor, having capacitance $C_{lc}$, further having a linkage resistance $R_c$ thereacross.

For purposes of explanation, the varistor element 25' is assumed to have a nearly ideal threshold conduction characteristic (FIG. 2b) wherein substantially no current flows until a voltage $V_v$ across the varistor, equal to the varistor breakdown voltage $V_b$, is reached; upon reaching the breakdown voltage $V_b$, the varistor element allows a wide range of currents I to flow therethrough, but maintains its voltage $V_v = V_b$ at a substantially constant magnitude. The optical response of liquid display cell 18' is determined by the voltage $V_c$ thereacross (FIG. 2c), whereby the transmissivity T of light through the cell is relatively small for low values of cell voltage $V_c$ and rapidly increases as the threshold voltage $V_{th}$ of the cell (as determined by the material and thickness of the liquid crystal layer) is approached; for some value of $V_c$ equal to $V_{on}$, the "on" voltage of the cell, maximum transmissivity T is reached and remains substantially constant for further increases of the voltage $V_c$ across the cell.

The non-linear varistor element 25' and liquid crystal cell 18' are in electrical series connection, whereby the total voltage $V_T$ (FIG. 2d) required to be across the series combination, from scan electrode 40' to column electrode 14, to effect a change in transmissivity T, is the series combination of the varistor breakdown voltage $V_b$ and the threshold voltage $V_{th}$ of the cell. Thus, for all total voltage $V_T$ less than the varistor breakdown voltage $V_b$, the varistor is essentially in the non-conducting condition, whereby sufficient current does not flow across the liquid crystal cell to cause the cell to turn "on" and allow transmission of light therethrough; the transmissivity T of the cell is thus substantially zero. As the total voltage $V_T$ is increased, the varistor breakdown voltage $V_b$ is exceeded and the voltage across the liquid crystal display cell is equal to the difference in total voltage and varistor breakdown voltage, i.e. $V_c = V_T - V_b$. The transmissivity of the cell increases as $V_c$ increases, until the total voltage equals the sum of the varistor breakdown voltage and the "on" voltage of the cell ($V_T = V_b + V_{on}$), when the cell has reached its maximum transmissivity and a substantial portion of the entering light is reflected back through the cell to be observable by an outside viewer. If, after the display cell is turned "on", the voltage is reduced, the varistor no longer conducts and the liquid crystal display cell capacitance $C_{lc}$ remains charged to keep the liquid crystal display cell in the "on" condition. Thus, the series connection of the non-linear varistor and liquid crystal display cell exhibits a storage, or memory, characteristic. The liquid crystal and varistor materials have finite leakage resistivity, particularly the liquid crystal cell leakage resistance $R_c$, which tend to discharge the liquid crystal capacitance $C_{lc}$, and eventually allow the voltage across the liquid crystal cell to decrease to less than the on and threshold voltages, $V_{on}$ and $V_{th}$, respectively, at which time the cell ceases to exhibit high transmissivity and again absorbs a relatively large portion of the entering light. Thus, the cell may be pulsed "on" and will remain in the "on" condition with storage time on the order of ten milli-seconds; therefore, the display is operated as a refreshed display such that, in a matrix display, a row is addressed with a short pulse, typically on the order of ten microseconds wide, and is refreshed once in every ten millisecond time interval. Therefore, the duty factor is on the order of about 0.1% and about 1,000 lines can be scanned prior to repeating, for a multiplex order N of about 1,000. Further, as the varistor is a symmetrical device, the polarity of the drive (or total) voltage may be periodically reversed to provide an AC voltage across the liquid crystal material and assure long life. A typical display requires an "on" voltage $V_{on}$ of about 15 volts, while a typical varistor slab, of about 0.4 millimeters thickness, has a breakdown voltage $V_b$ of about 60 volts, whereby a voltage pulse of about 75 volts is required, but at relatively low current, typically on the order of microamperes, to facilitate the afore-mentioned "on" pulses of about 10 microseconds duration.

The resolution limits of a matrix multiplex display are determined by the varistor capacitance $C_v$, which is in turn established by the relatively large dielectric constant, $\epsilon > 1,000$, of the varistor material. I have found that the total varistor capacitance $C_v$ must be small with respect to the liquid crystal cell capacitance $C_{lc}$ and should be on the order of ten times less than the cell capacitance to avoid establishing a capacitive voltage divider which would tend to turn "on" non-selected elements in the scan matrix. Thus, as the dielectric constant of the varistor material is on the order of one hundred times greater than the dielectric constant of the liquid crystal material, and as the spacing of the varistor contacts 30 and 39 (FIG. 1b) is only about five to thirty times as great as the distance between the liquid crystal cell column and rear cell electrodes 14 and 16, the varistor contact area, i.e. the diameter of the varistor contact 30 and 39, must be much smaller than the area of each liquid crystal cell in the display matrix. For example, a planar varistor wafer 25 of about 15 milli-inches thickness is used with insulators 12 and 35 of about 3 milli-inches thickness and contact pins 30 and 39 of about 3 milli-inches diameter, with a total rear cell electrode area of about 2500 square milli-inches.

The metal-oxide varistor material preferred for use in this embodiment is a sintered mixture of ZnO powder and small amounts of other metal oxides, such as bismuth oxide ($Bi_2O_3$) and manganese oxide ($MnO_2$). The resultant varistor material consists of semiconducting ZnO grain surrounded by thin insulating tunneling boundaries which produce the highly non-linear voltage-current characteristic of FIG. 2b when an electric field is applied thereacross. The use of a metal-oxide varistor layer 25 for the non-linear series element is advantageous in that the varistor material is a ceramic and is easily formed by standard ceramic processing techniques, whereby large homeogeneous members may be easily fabricated. Further, the varistor material provides the required non-linear conduction as a bulk material characteristic, whereby surface contamination and defects do not present the serious problem, while the zinc oxide grain size can be varied over a wide range to control the magnitude of the breakdown field and breakdown voltage. Accordingly, the material is designed with a breakdown field establishing a convenient electrode spacing as dictated by the required matrix display resolution. However, the use of a varistor ceramic material with random variation and grain size causes as much as a ten percent variation and breakdown voltage among non-linear devices in the same varistor layer, whereby the driving circuitry must be designed such that it is tolerant of this variation.

Figure 3A:
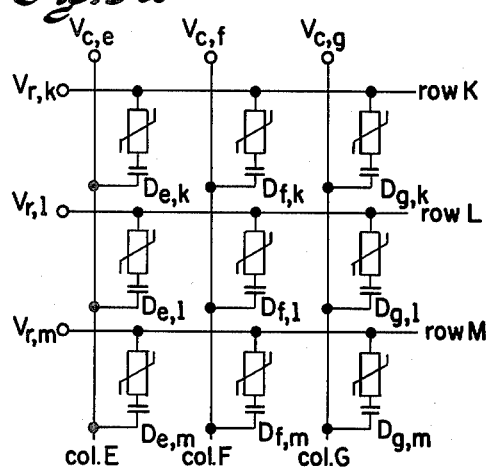
FIG. 3a is a schematic representation of a display having a matrix of the varistor-control liquid crystal display cells.

Referring now to FIGS. 3a-3d, a multiplexible matrix display 45 (FIG. 3c) includes a two-dimensional matrix of substantially-square display areas, each having a side dimension S of about 50 milli-inches, whereby a twenty lines per inch resolution is achievable. The multiplicity of display elements are arranged in a plurality of vertical columns and horizontal rows, whereby a particular display element $D_{x,y}$ is designatible with (as illustrated) the column x designation appearing first and being designated by one of illustrated columns e, f or g; the row y designations are arbitrarily assigned, for the purposes of illustration, as rows k, l or m. Thus, for three columns and three rows, a total of nine display elements $D_{e,k}$–$D_{g,m}$ are schematically shown. FIG. 3a illustrates each display element as a series combination of a non-linear element and a liquid crystal cell "capacitance" with one terminal of each cell non-linear element being coupled to one of the row K, row L or row M drive lines on which appear respective row drive voltages $V_{r,k}$; $V_{r,l}$, or $V_{r,m}$, respectively. Similarly, the remaining liquid crystal cell electrodes are coupled to one of the Col. E, Col. F, or Col. G column drive lines respectively driven by the multiplex column voltages $V_{c,e}$; $V_{c,f}$, or $V_{c,g}$, respectively.

Figure 3C:
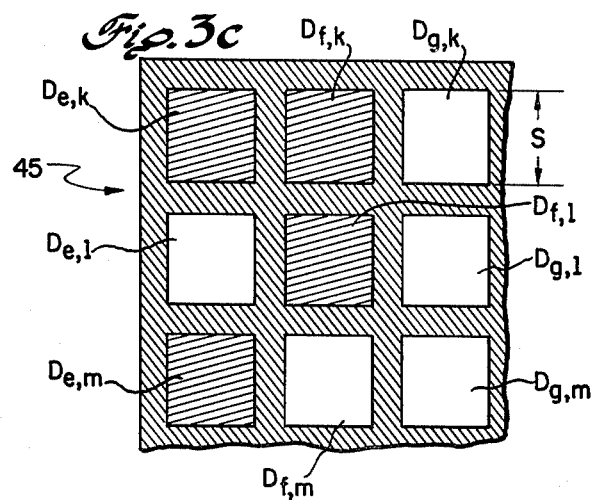
FIG. 3c is a front view of a portion of a matrix display, illustrating the display characteristics when the display matrix of FIG. 3a is driven by the display drive waveforms of FIGS. 3b or FIG. 3d.
Figure 3B:
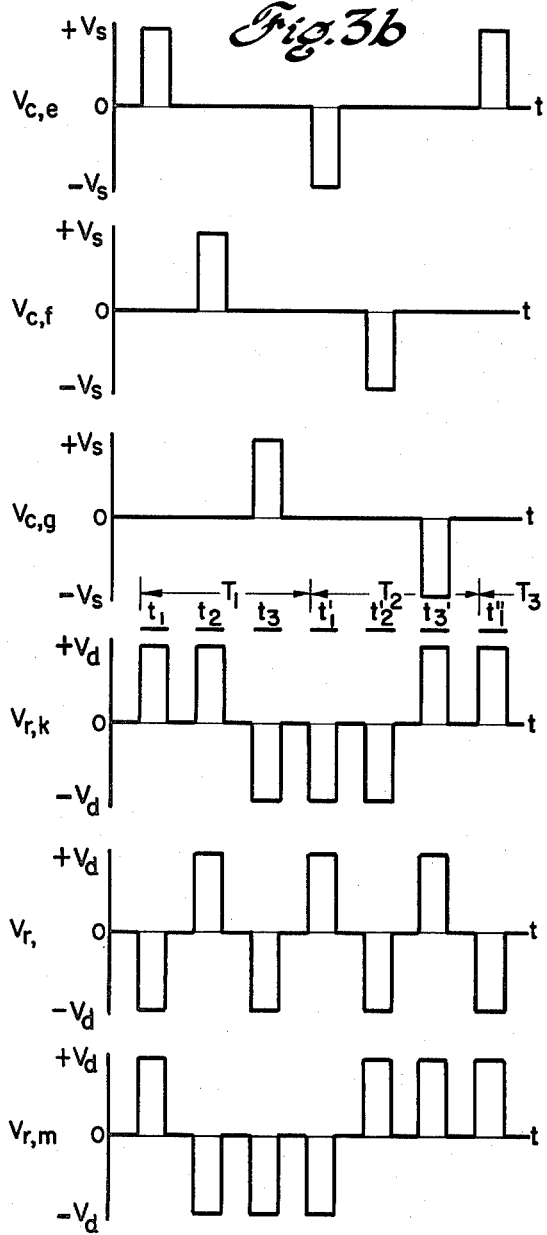

One set of multiplexed drive waveforms usable with the display (of FIG. 3a) is illustrated in FIG. 3b. The first column drive voltage $V_{c,e}$ is pulsed to a peak value of $+V_s$ volts during the first multiplexing time interval $t_1$, of the first multiplex sequence time period $T_1$, while the row electrode voltages $V_{r,n}$ (n=k,l,m) are pulsed to a positive magnitude ($+V_d$). The net voltage across the associated liquid crystal display cell will be substantially zero, providing a "dark" display area, if the net voltage $(V_s - V_d)$ is less than the breakdown voltage $V_b$ of the non-linear series element. If the net voltage across the series combination is greater than $V_b + V_{on}$, then the cell defined by the selected pair of the column end row lines, is in the "bright", or light reflective, condition. As seen in FIG. 3c, for the first display column, consisting of display elements $D_{e,n}$ (n=k,l,m), the cells in the k-th and m-th rows are in the absorptive, "off" or "dark" condition, while the cell in the l-th row is in the reflective, "on" or "bright" condition. Thus, the first and third row voltages $V_{r,k}$ and $V_{r,m}$, are positive pulses of magnitude $V_d$, whereby the net voltage across the series combination of non-linear element and display cell for that point on the matrix is of magnitude less than $V_b$ to provide the required dark cell, while the row voltage $V_{r,l}$ is a negative polarity pulse to provide a net cell voltage of $(+V_s)-(-V_d)$ or $V_s+V_d \geq V_b+V_{on}$ to realize the bright display element for display location $D_{e,l}$. The display elements in the second and third rows, with designation $D_{f,n}$ and $D_{g,n}$ (n=k,l,m), do not respond as their column selected voltages $V_{c,f}$ and $V_{e,g}$, are of zero magnitude during the first multiplex time intervals, $t_1$, and only the row select voltages appear across the series-connected liquid crystal cell and non-linear element combinations thereof. The magnitudes $V_s$ and $V_d$ of the voltage pulses are selected to be less than the breakdown voltage $V_b$ of the particular non-linear element (varistor layer) utilized, whereby the liquid crystal cells in columns F and G remain unaffected during excitation of the column E display cells.

In the second multiplex time interval $t_2$ of the first sequence, only the column voltage $V_{c,f}$ for the second column is at a non-zero level, whereby the various row voltages then present establish the absorption and reflection characteristics of the associated liquid crystal display cells. Thus, as the row K and row L voltages $V_{r,k}$ and $V_{r,l}$, respectively, are positive, the net voltage across the associated liquid crystal display cells is substantially zero and display elements $D_{f,k}$ and $D_{f,l}$ are in the "off", or light-absorptive, condition. The row M voltage is negative and the net voltage across the associated display element $D_{f,m}$ is such as to place the liquid crystal display cell of that element in the "on", or light-reflective, condition. Similarly, during the third multiplexing time intervals $t_3$, all of the row voltages $V_{r,k}$, $V_{r,l}$ and $V_{r,m}$ are all negative, whereby the net voltage across the associated display elements $D_{g,n}$ (n=k,l, and m) are all of magnitude essentially equal to $V_s+V_d$, and the three associated display elements $D_{g,k}$, $D_{g,l}$ and $D_{g,m}$ are all in the light-reflective, or "on", condition. The storage mechanism of each cell capacitance continues to energize those of the display elements which were previously energized, even after the column drive voltage is switched away from the column line associated with each particular driven element. Thus, display element $D_{e,l}$ was energized in the first multiplexed time interval $t_1$ and remains energized during subsequent multiplexing time intervals $t_2$ and $t_3$.

At the end of the first sequence $T_1$ of multiplexing time intervals $t_1$–$t_3$, all of the column lines have been energized in sequence, and a second sequential energization of the column lines commences at the beginning of sequence period $T_2$. Advantageously, the polarity of the column and row drive pulses are reversed after each multiplex drive sequence period, to realize an AC waveform excitation of the liquid crystal cell. Thus, in the first multiplexing time interval $t_{1'}$, of the second multiplexing sequence period $T_2$, the first column drive voltage $V_{c,e}$ is a negative polarity pulse of magnitude $-V_s$, and the polarity of the respective row drive pulses are reversed, e.g. the dark area of display elements $D_{e,k}$ and $D_{e,m}$ are provided by negative polarity pulses of magnitude $-V_d$ on the first and third row lines (row drive voltages $V_{r,k}$ and $V_{r,m}$, respectivey). The net voltage across the bright display element $D_{e,l}$ is the difference between the negative column pulse and the positive row pulse, for a net amplitude of $-(V_s+V_d)$; the net voltage across each of the dark elements is $|V_s+V_d|<|V_b|$. During subsequent column drive time intervals $t_{2'}$, $t_{3'}$, etc. of the second multiplex sequence period $T_2$, the column voltages $V_{c,f}$ and $V_{c,g}$ are both negative pulses and the row voltage drive pulses are the inverse of the pulses present during this corresponding time intervals $t_2$, $t_3$, etc. of the first drive sequence period $T_1$, for like row voltage drive signals. The second sequence period $T_2$ of multiplex drive signals ends and the third multiplex drive sequence period $T_3$ commences with the column voltages being sequential positive pulses and the row drive signals having the same polarity as in the first multiplex drive sequence period $T_2$. Thus, during the first time interval $t_{1'}$, of the third multiplex drive sequence period $T_3$, the first column voltage $V_{c,e}$ is again a positive pulse and the pulses on the respective row lines are again of positive polarity on the $V_{r,k}$ and $V_{r,m}$ signals.

In summation, each column of the matrix is sequentially scanned with a fixed amplitude voltage pulse of magnitude $V_s$, while data pulses of switchable polarity $\pm V_d$ are applied to the rows. To turn a display element "on", the data pulse is applied to a scanned row electrode with the opposite polarity from the polarity of the column pulse, whereby the voltage across the liquid crystal-varistor series combination exceeds the breakdown voltage $V_b$ by the voltage required to turn on the liquid crystal elements. Similarly, a data pulse of the same polarity as the column pulse will leave the display element in the "off" position. The polarity of all waveforms is periodically reversed, at the end of a multiplexing sequence, and typically with an odd-even multiplexing period sequence on the order of thirty times per second, so that the liquid crystal material has an AC voltage thereacross to assure long life thereof.

I had found that variations of the liquid crystal cell "on" voltage $V_{on}$ with variations in the varistor breakdown voltage $V_b$ may be minimized if the magnitude $V_d$ of the row drive voltage pulses (that is, the pulse peak voltages for voltages $V_{r,n}$, where n=k,l and m) is equal to about one-quarter of the peak pulse magnitude of the column pulse, of magnitude $V_s$. Thus, a data row voltage amplitude $V_d = V_{r,n}$ (n=k,l,m) would be about 0.25 $V_s$, and, if $V_b$ and $V_d$ have the relationship $V_b = 3.3 V_d$, then a 10% variation in $V_b$ produces only about a 20% change in $V_c$, where $V_c = V_s + V_d - V_b$.

Figure 3D:
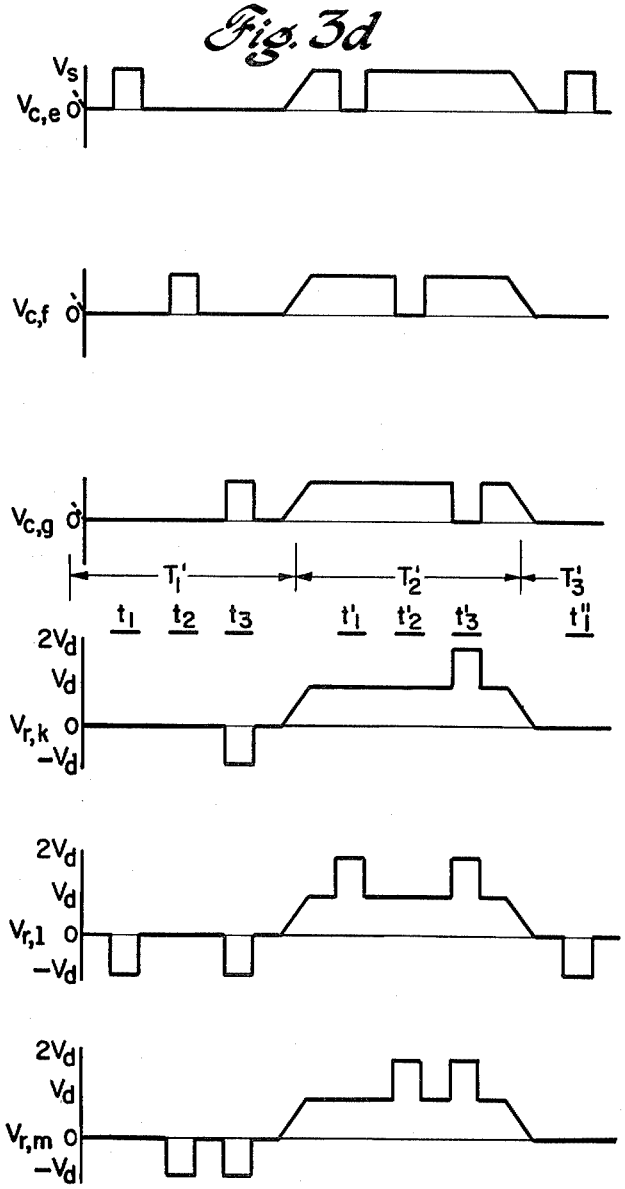

The driving waveforms of FIG. 3b require drivers capable of three different output voltage states or levels, for both the column (scan) and row (data) driving waveforms. However, the driving waveforms may be provided by two-level drivers, with associated waveforms as illustrated in FIG. 3d, whereby bipolar drivers of lower cost and complexity may be utilized in the driver circuitry (not shown for reasons of simplicity).

Each of the sequential scanned column lines is driven by a waveform $V_{c,n}$ (where n=e,f,g) providing a first output level substantially equal to zero volts and a second output level substantially equal to $+V_s$ volts. The row voltages $V_{r,n}$ (n=k,l,m) may be driven between a first level of substantially zero volts and a second level of $-V_d$ from a two-level driver, but without providing a periodic reversal of the liquid crystal cell "on" voltage. To provide the periodically-reversing "on" voltage, the resting level of the two-level data waveform may be, as illustrated, shifted during alternating sequence periods such that the resting level is zero volts during odd-numbered sequence periods and, during even-numbered sequence periods, the resting level is $+V_d$ volts. During the even-numbered sequence periods, the peak polarity of the data pulses is reversed, with respect to the peak polarity during the odd-numbered sequence periods. The values of the peak column drive voltages $V_s$ and the peak row drive voltage $V_d$ are chosen such that the voltage across the series varistor-cell combination is $V_s + V_d = V_b + V_{on}$, with both $V_s$ and $V_{on}$ being less than $V_b$. The widest operating margin is achieved when $V_s = V_d$.

Thus, during a first time interval $t_1$ of a first multiplexing sequence period $T_1'$, the first column voltage $V_{c,e}$ is pulsed to a positive peak voltage $V_s$ and the row voltages $V_{r,k}$ and $V_{r,m}$, representing "dark" cells, are respectively at the zero voltage resting level. The row voltage $V_{r,l}$, representing a "bright" cell, is pulsed to a negative peak voltage of absolute magnitude $V_d$. The net voltage across the liquid crystal cells at locations $D_{e,k}$ and $D_{e,m}$ are thus $(+V_s)$ and is less than $(V_b)$; these cells are dark. The net voltage across the remaining cell in the e-th column (cell $D_{e,l}$) is the sum of the positive column and negative row voltages, $(+V_s) - (-V_d) = 2V_s$, whereby the defined cell is in the "on", or light-reflective, condition. Similarly, during the second and third time period $t_2$ and $t_3$, respectively, the positively pulsed second and third column voltages $V_{c,f}$ and $V_{c,g}$ are combined with the zero resting level or negative peak $V_d$ magnitudes of the row voltages to render the cell at the cross-point of the particular column and row lines in one of the "on" or "off" conditions. At the end of the first scan sequence period $T_1'$, the column voltages are shifted from the initial resting level of about zero volts, to a new resting level at the positive peak ($V_s$) voltage. The column drive pulses are now morenegatively going pulses, i.e. from the positive ($+V_s$) level to the zero level. The resting level of each row voltage, previously having magnitude of approximately zero volts, is shifted positive by the same amount as the positive shift in the column voltages, whereby the new resting level for the row voltages is at $+V_d = +V_s$ volts. The individual row voltages during each of the multiplexing time intervals $t_1'$, $t_2'$, $t_3'$, etc., are of inverted polarity from the same data pulses during the like time intervals in the first sequence period $T_1'$, and are driven to a level of $+2V_d$ to drive the cell "on" and to the resting voltage level for driving the cell "off". At the end of the second sequence period $T_2'$, both the column and row voltages are shifted to a resting level of about zero volts and the drive voltages essentially repeat the sequence during the first sequence period $T_1'$. Thus, all odd sequence periods provide identical column and waveforms for identical data display, and all even sequence periods provide another identical set of data waveforms, which are the inverse of the odd-period waveforms, shifted about a voltage equal to one-half the non-zero resting voltage, i.e. one-half $V_s$ = one-half $V_d$.

Figure 4B:
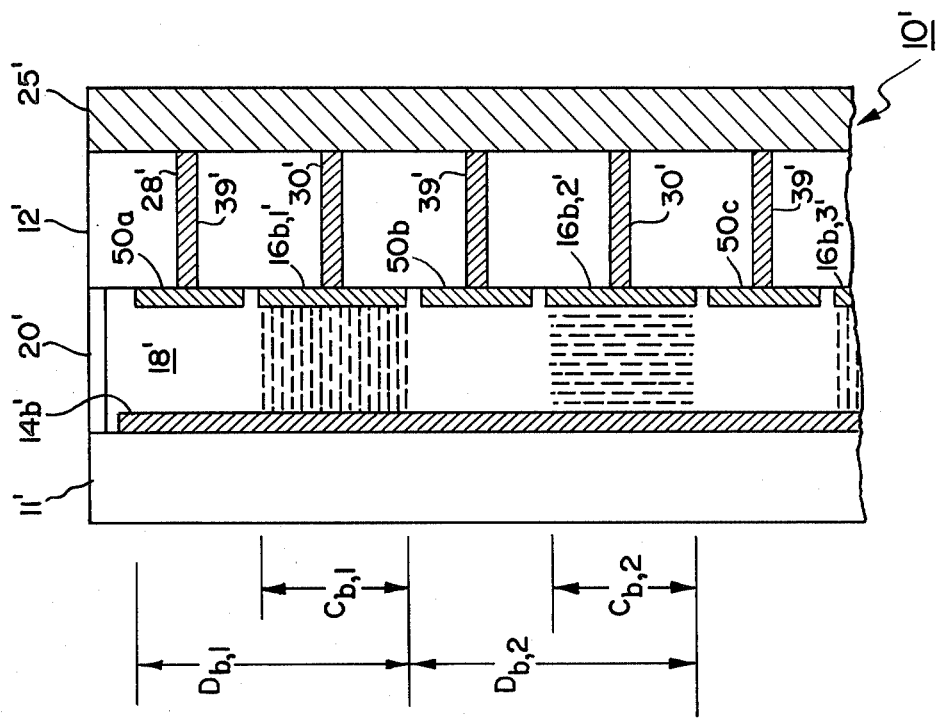
Figure 4A:
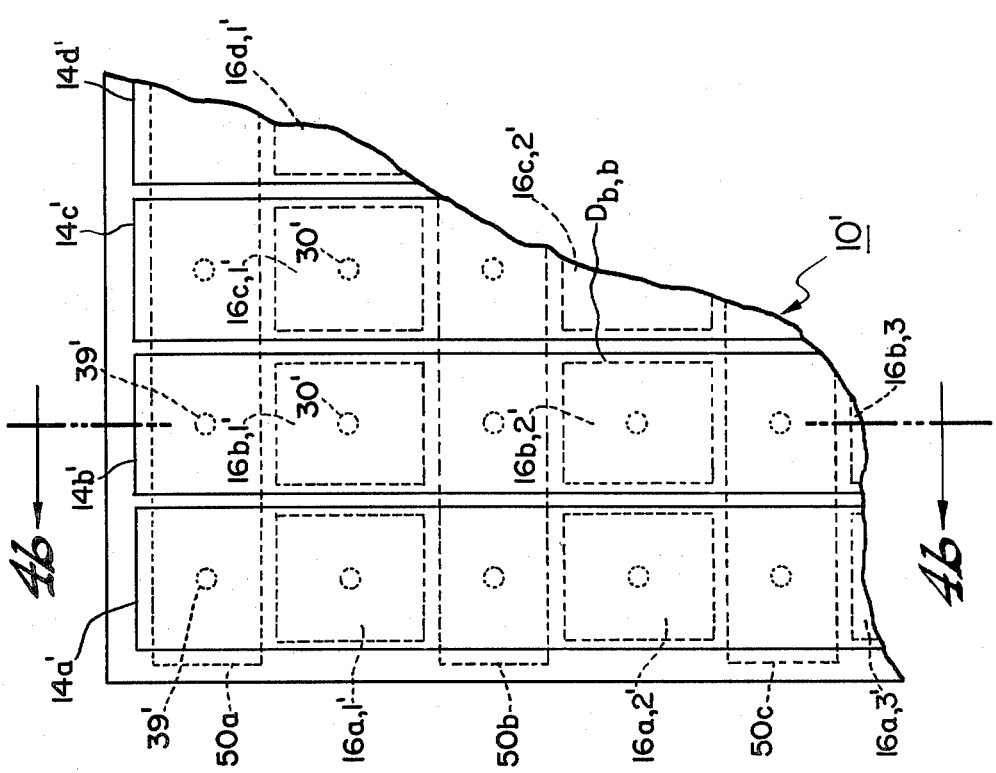
FIG. 4a is a front plan view of a portion of another presently preferred matrix display embodiment.

Referring now to FIGS. 4a and 4b, another preferred embodiment of a matrix-addressable multiplexed varistor-controlled liquid crystal display is illustrated. In the illustrated portion of display 10', each liquid crystal display cell is provided, as in all other embodiments described herein, in series with a non-linear device formed of a portion of a varistor member 25'. The varistor member supports a rear insulative substrate 12' having a matrix of apertures 28' formed therethrough. A front substrate 11' is parallel to, but spaced from, the rear substrate, and has disposed upon its interior surface a plurality of essentially parallel, vertically-disposed column electrodes 14a'–14d', each insulated from the others. A plurality of data, or rear cell electrodes, e.g. electrodes $16_{a,1}'$–$16_{d,2}'$, are disposed upon the interior surface of rear substrate 12'; in the illustrated embodiment, the rear-cell electrodes are substantially square and disposed in a rectangular matrix with each electrode parallel to, but spaced from and in registration with, one of column electrodes 14a'–14d'. The surfaces of the data electrodes facing front substrate 11', have a highly reflective surface. Associated with each horizontally-disposed row of data electrodes $16_{a,1}'$–$16_{d,2}'$, is a scan electrode, e.g. scan electrodes 50a–50c, each coplanar with the associated row of rear cell electrodes and horizontally disposed to one side thereof (in the illustrated embodiment, horizontally above) upon the same surface of substrate 12'. Each of apertures 28', through rear substrate 12', underlies the area of each of the scan and data electrodes, where crossed by each of the orthogonally-disposed column electrodes. Within each of apertures 28' is located either a conductive pin 30', connecting one of the matrix of data (rear-cell) electrodes to the varistor member, or a conductive pin 39', connecting one of the scan electrode matrix positions with the same surface of the varistor member as pins 30'. Thus, each display cell $D_{x,y}$, where x is the column number (x=a,b,c, or d, in the illustrated embodiment) and y is the associated row number (y=1,2 or 3, in the illustrated embodiment), has an area defined by the narrower horizontal width of the vertically-disposed column electrode or the horizontal dimension and the vertical length of the coplanar and horizontally disposed data and scanned electrodes. Thus, data cell $D_{b,2}$ is as wide in the horizontal direction as the narrower one of the rear cell electrode 16b' and column electrode 14b', and is as high in the vertical direction as the total height of data electrode 16b' and its associated scan electrode 50b and the insulative space therebetween. It will be seen that the active portion e.g. $C_{b,2}$, of each cell, e.g. $D_{b,2}$, is limited in height, by the vertical dimension of the data electrode, e.g. data electrode 16b', with the height of the associated scan electrode 50b providing an optically-dead area. Accordingly, the resolution of this form of matrix display is relatively poorer than the resolution of the matrix display illustrated in FIGS. 1a and 1b. Thus, in operation, the liquid crystal material 18' between a particular column electrode, e.g. 14b', and a particular data electrode, e.g. 16b,1', in a particular display cell $D_{b,1}$, is placed in the light-transmissive condition by providing a column driving signal to the column electrode 14b' and a row signal to the scan electrode 50a associated with the cell, much that the net voltage therebetween is at least $V_b+V_{on}$. The light, reflected from the row electrode portion driven through the varistor member, defines a visible area of height $C_{b,1}$. If the associated scan electrode, e.g. 50b, does not receive a driving waveform of amplitudes sufficient, when combined with the amplitude of the column driving signal, to exceed the sum of the varistor break-down voltage and the liquid crystal cell "on" voltage, the liquid crystal molecules remain aligned parallel to the electrode surfaces and absorb light, whereby the entire cell area of height $D_{b,a}$ appears as a dark area.

Referring now to FIGS. 5a and 5b, a portion of another varistor-controlled multiplexed liquid crystal display 10'' is illustrated, having increased resolution with respect to the embodiment of FIGS. 4a and 4b, but in which the electrodes also contact only a single surface of the varistor member 25''. In this embodiment, a plurality of vertically-disposed column electrodes 14a''-14e'' are again fabricated upon the interior surface of a substantially transparent and insulative front substrate 11'', in manner whereby the column electrodes are parallel to and spaced from one another. A first rear substrate 12'' is arranged parallel to, but spaced from, front substrate 11''. Positioned upon the interior surface 12a'' of substrate 12'' are a plurality of rectangular data, or rear cell, electrodes, e.g. electrodes $16_{a,1}''-16_{c,2}''$, illustrated as being arranged in a rectangular matrix with the rear cell electrodes arranged parallel to, but insulated from, one another. Each of the data electrodes $16_{a,1}''-16_{e,2}''$ have reflective front surfaces. Upon the opposite surface 12b'' of the first rear substrate, and underneath each associated row of data electrode, e.g. the row of data electrodes $16_{a1}'-16_{e,1}'$ is fabricated a conductive one of scan electrodes 60a-60c, e.g. scan electrode 60a, having a vertical height less than the vertical heights of the associated row of data electrodes. Thus, when viewed through front substrate 11'', the area of a display cell is defined by the lesser horizontal dimension D of either the vertically disposed column electrode or the rear-cell electrode in registration therewith, and by the vertical dimension of the horizontally-disposed data electrode, behind which the associated scan electrode is effectively hidden. A second rear substrate 65 is placed against the first rear substrate rear substrate rear surface 12b''', and the varistor member 25'' is placed upon the surface of the second rear substrate 65 furthest from rear substrate 12''. A series of apertures 28'' are formed completely through both rear substrates 12'' and 65, to allow a conductive pin 30'' to connect the surface of the varistor member to each row data electrode in each display cell (formed at each matrix position identified by the registration of a column electrode with a data electrode). Second rear substrate 65 additionally has another plurality of apertures 66 formed therethrough to allow shorter pins 39'' to connect the varistor member surface to the associated scan electrode, within each of the defined data cells.

Matrix display 10'' operates in manner similar to multiplexed matrix display 10 (FIGS. 1a and 1b) and 10' (FIGS. 4a and 4b), with scan electrodes 60a-60c acting as the row select leads. Advantageously, because the entire height of a row of the display is formed by the height of one of data electrodes $16_{a,1}''-16_{e,3}''$, the resolution of display 10'' is greater than that of display 10', and resolution of at least 20 lines per inch are practical. Even greater resolution is obtainable by reducing the area of each rear-cell electrode (and therefore the area of the cell itself) and compensating for the reduced magnitude of energy-storing cell capacitance by adding an additional capacitance $C_a$ in parallel with the liquid crystal layer capacitance $C_{lc}$. This is accomplished by providing an additional one of vertically-disposed electrodes 70a-70e for each column electrode, with the additional electrodes in abutment upon the same surface of varistor slab 25'' as second insulator 65, and with the vertically-disposed additional electrodes separated from each vertical line of data and scan electrode pins 30'' and 39'', respectively. The additional capacitance $C_a$ appears between the additional electrode, e.g. electrode 70c, having the same potential thereon as the associate column electrode, e.g. 14c''', to each of the data electrode $16_{c,1}''-16_{c,1}''$. Thus, the capacitance in series with the non-linear element is increased and is greater than the non-linear element capacitance. In this manner, displays having resolutions on the order of 35 lines per inch have been achieved.

In any matrix display, having K display cells therein, the number of drive lines is the sum of the number N of horizontal column drive lines plus the number M of vertical row drive lines. The minimum number of drive lines for a display of $N \times M = K$ matrix cells, occurs when a square matrix display is used, wherein $N = M = \sqrt{K}$. However, the number of display drive lines may be even further simplified for any rectangular matrix having a number R of horizontally-disposed rows and a number C of vertically-disposed columns, wherein at least one of R and C is a non-prime integer. The number of row R and/or column C signals can be themselves derived from a secondary matrix of storage elements.

Figure 6:
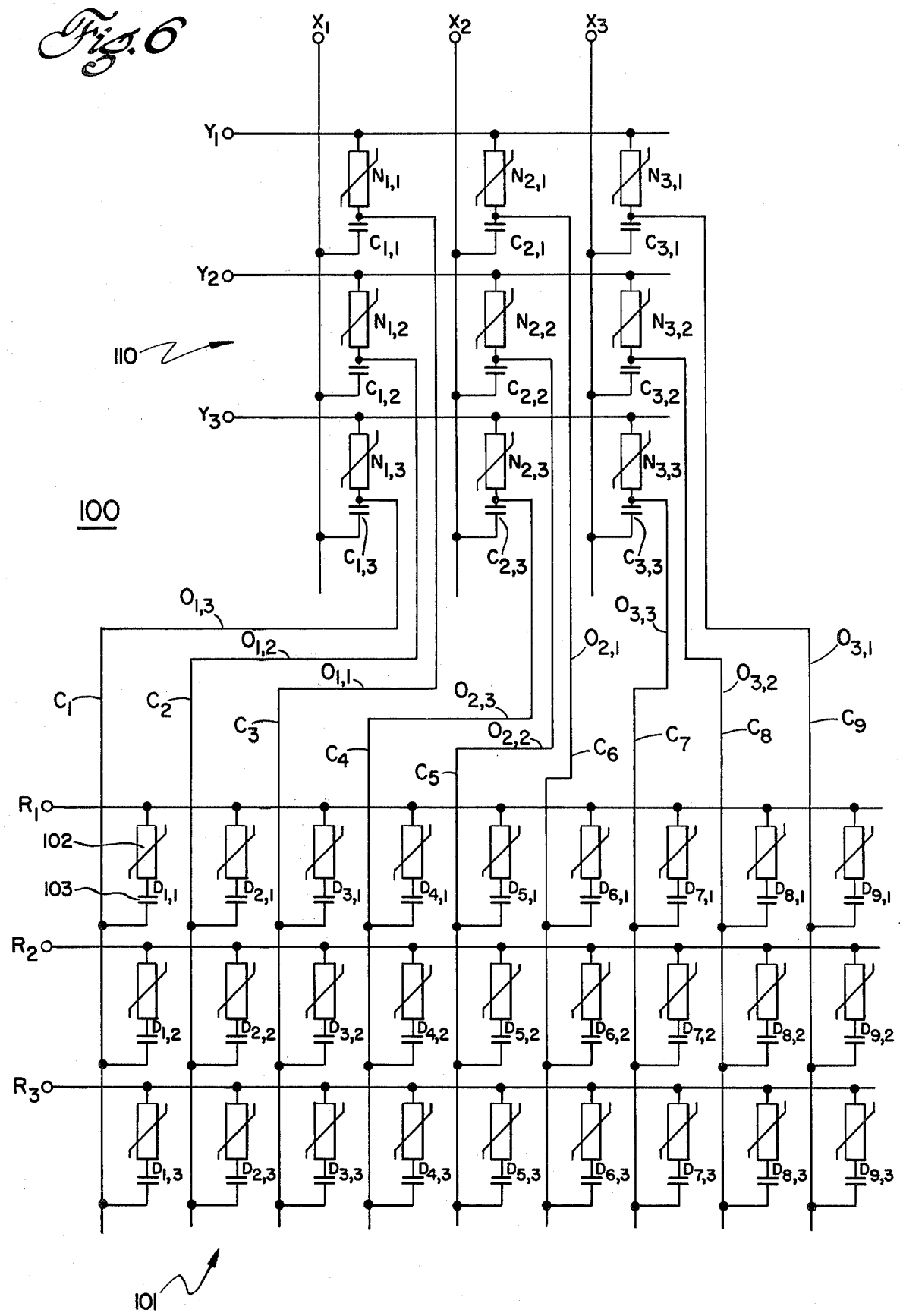
FIG. 6 is a schematic diagram illustrating the use of an adjunct varistor-capacitor matrix for reducing the number of connections to the overall display apparatus, and of the matrix varistor-control liquid crystal display associated therewith.

Referring now to FIG. 6, a portion of a matrix display 100 includes a varistor-controlled multiplexible display matrix portion 101 having display elements $D_{1,1}-D_{9,3}$, in the illustrated embodiment, with three rows $R_1-R_3$ and with nine columns $C_1-C_9$. Each display element, e.g. display element $D_{1,1}$, is formed of one of the above-described series combinations of a non-linear element 102 and a liquid crystal cell having a capacitance 103. As illustrated, this $3 \times 9$ portion of the matrix display would normally require $3+9=12$ leads. However, an auxiliary matrix 110 is utilized to provide the column signals required, and results in a lesser number of drive connections to circuitry outside the matrix display apparatus. As illustrated, auxiliary matrix 110 consists of a matrix of non-linear elements $N_{1,1}-N_{3,3}$, each in series with an associated capacitance $C_{1,1}-C_{3,3}$, respectively. An output, one of $O_{1,1}-O_{3,3}$, respectively, is taken from each cell at the junction between the non-linear element and capacitance element thereof. Each output is coupled to an associated column electrode in the display matrix 101. The remaining terminal of each two-terminal non-linear element, in a horizontally disposed row of auxiliary matrix cells, is coupled in parallel to one of a plurality of auxiliary matrix scan lines $Y_1$-$Y_3$. The remaining terminal of each of the capacitive elements of the auxiliary matrix is coupled to one of a plurality of vertically-disposed auxiliary matrix data lines $X_1$-$X_3$.

In operation, the voltages simultaneously presented to data lines $X_1$-$X_3$ are the data voltages associated with a particular one of scan lines $Y_1$-$Y_3$ of the auxiliary matrix. Thus, in a first time interval, the auxiliary matrix data lines $X_1$-$X_3$ have supplied thereto, by driver circuitry not shown for reasons of simplicity, voltages indicative of the voltages to eventually appear at the third, sixth and ninth column lines $C_3$, $C_6$, and $C_9$, respectively. Simultaneously with the application of the driving voltages to auxiliary memory data lines $X_1$-$X_3$, the first auxiliary matrix scan line $Y_1$ is energized with a signal of magnitude such that the total voltage across the series-connected combination of non-linear and capacitive elements coupled between scan line $Y_1$ and each of the data lines $X_1$-$X_3$ will cause the breakdown voltage of the associated non-linear elements to be exceeded, with subsequent storage of a signal voltage across the associated series-connected capacitive elements, responsive to the magnitude of the signals furnished to the respective data lines $X_1$-$X_3$. Therefore, if a pulse voltage of peak magnitude less than or equal to the breakdown voltage $V_b$ of the non-linear elements $N_{X,Y}$ is placed on first scan line $Y_1$, the voltage stored in one of capacitance elements $C_{1,1}$, $C_{2,1}$ and/or $C_{3,1}$ will be determined by the magnitude of the respective voltages are respective data lines $X_1$-$X_3$. That is, if the voltage on one of the data lines is of negative peak magnitude, the total voltage across a series-connected non-linear/capacitive combination will exceed the breakdown voltage of the non-linear element and cause a positive voltage to be stored across the associated capacitive elements; if the data voltage is of zero magnitude, or is of a positive magnitude, the total voltage across the series-connected nonlinear/capacitive elements combination will not exceed the breakdown voltage of the non-linear element and a voltage of zero magnitude will be stored across the capacitive element of that series-connected combination. The scan lines $Y_1$-$Y_3$ are sequentially energized, while the entire set of data lines $X_1$-$X_N$ (where N=3 in the illustrated embodiment) are receiving simultaneous signals indicative of the column values to be stored.

Simultaneously therewith, the row lines $R_1$-$R_N$ (N=3 in the illustrated embodiment) of the display matrix 101 are sequentially scanned, with the column signals, on column lines $C_1$-$C_M$ (where M=9 in the illustrated embodiment), being supplied by the voltage stored in the associated capacitor of the associated auxiliary matrix element. Thus, for a 3×9 matrix, as illustrated, the 3+9=12 leads required for a two-dimensional matrix are further compressed to a total of 3+(3+3)=9 leads for the "three dimensional" matrix as illustrated.

The number of display elements $K'$ in display matrix 101 is now established by the number of row lines R, and the number of data and scan lines X and Y, respectively, of auxiliary matrix 110. Accordingly, $K'=X\times Y\times R$ and the number of leads is $X+Y+R$, which lead number may be minimized when $X=Y=R=\sqrt[3]{K'}$. For large matrix displays, considerable reduction in the number of leads occurs; for example, if a matrix display 101 has a total of one million display cells, e.g. $K'=10^6$, the display matrix may be arranged such that R=100, with the number of columns $C=X\times Y$, where $X=Y=100$ and $C=10^4$. Thus, the number of leads (and the number of associated drivers)=300 with a "third-dimensional" auxiliary matrix, as opposed to a $10^3\times 10^3$ two-dimensional matrix would would require 2000 leads and associated drivers. The auxiliary matrix form is even more advantageous if a "four-dimensional" form is utilized, wherein both the column and row lines of the matrix display are themselves each driven by an auxiliary row matrix and auxiliary column matrix, respectively. For example, a matrix display having a total of 40,000 individually energizable display cells can be arranged with a format of 100 rows and 400 columns. The 100 row lines may themselves be driven by a 10×10 auxiliary row matrix, itself requiring only ten row data lines and 10 row scan lines, while the 400 column lines may be driven by a 20×20 auxiliary column matrix, itself requiring only 20 column data lines and 20 column scan lines. Thus, the "two-dimensional" form would require 100+400=500 control lines and associated drivers, while the "four-dimensional" form requires only 10+10+20+20=60 total externally-addressable control lines and associated drivers.

The present invention has been described with reference to several presently preferred embodiments thereof. Many variations and modifications will now occur to those skilled in the art.

In particular, electrodes of arbitrary shape may be utilized to cause a particular cell to define a selected indicia shape; the placement of cells need not be in the form of a matrix, but may be random within a given field; and other display materials, such as dynamic scattering liquid crystal materials, electrophoretic materials, electroluminescent materials and the like, may be used, subject to the requirement that either the selected material allows an electrical capacitance to be formed between the two material-bounding electrodes of each cell or the additional electrode capacitance $C_a$ is used to provide the energy storage capacitance for each cell.

It is my intent, therefore, to be limited only by the scope of the appending claims, rather than the detail of the several specific embodiments described herein.

What is claimed is:

1. A multiplexible matrix reflective display, comprising:
   a plurality of substantially parallel and substantially transparent elongated and continuous column electrodes arranged spaced each from the others in a first direction in a first plane, each of said column electrodes adapted for having a column driving voltage coupled thereto;
   a plurality of reflective and substantially flat coplanar rear cell electrodes arranged spaced each from the others in a matrix extending in both said first direction and in a second direction, substantially transverse to said first direction, in a second plane parallel to, and spaced behind, said first plane;
   a plurality of substantially parallel row electrodes arranged spaced each from the others in said second direction and with only one of the row electrodes positioned substantially parallel to an associated row of said rear cell electrodes, each of said row electrodes adapted for having a row driving voltage coupled thereto;
   a layer of optically active material positioned as the only element between said first and second planes, said layer having a matrix therein of cells each defined by the registration of one of said plurality of column electrodes and one of said plurality of rear cell electrodes; the optically active material in each cell respectively absorbing therein and transmitting therethrough light entering said cell responsive to the magnitude of the voltage between the portions of the column and rear cell electrode defining said cell being respectively less than and at least equal to a preselected voltage magnitude;

a member of an electrically non-linear resistive material, positioned substantially parallel to the plane of at least said optically active layer and substantially covering the entire area of and in registration with said optically active layer, said member having a matrix of positions defined thereon with each position forming a passive, monotonic non-linear resistance element in correspondence to one display cell of the display cell matrix, said material having a preselected break-down voltage below which break-down voltage substantially no current flows through said material and above which break-down voltage substantial amounts of current can flow therethrough and with a voltage drop across said member being substantially equal to said break-down voltage; and means for coupling each matrix position of said member between an associated rear cell electrode defining a matrix cell and the row electrode associated with that rear cell electrode;

each matrix cell absorbing light incident thereon if the magnitude of a total driving voltage coupled between the column and row electrodes defining that cell in the display cell matrix is less than the sum of the break-down voltage of the non-linear material and the preselected voltage magnitude for the optically active material layer; each matrix cell always reflecting light incident thereon if the magnitude of the total driving voltage coupled between said column and row electrodes defining that cel of said display cell matrix is greater than the sum of said break-down voltage and the preselected voltage magnitude for the optically active material layer.

2. The display of claim 1, wherein said electrically non-linear material is a varistor material.

3. The display of claim 2, wherein said varistor material is comprised of zinc oxide.

4. The display of claim 1, wherein the column electrodes are fabricated of indium tin oxide.

5. The display of claim 1, wherein the optically active material is a liquid crystal material.

6. The display of claim 5, wherein the optically active material is a dichroic liquid cr ystal material.

7. The display of claim 1, wherein said non-linear resistive material member has opposed first and second surfaces; said plurality of rear cell electrodes and said plurality of row electrodes being fabricated adjacent to opposite ones of said member surfaces and in registration each with the other.

8. The display of claim 7, wherein said coupling means comprises a plurality of conductive members each in electrical connection between that rear cell electrode forming a part of a matrix cell and an associated matrix position on the first surface of said member; and another plurality of conductive members each in electrical connection between the associated matrix position upon said second surface of said member and the row electrode associated with the rear cell electrode defining that matrix position.

9. The display as set forth in claim 8, further comprising a first insulative substrate interposed between the first surface of said member and the co-planar plurality of rear cell electrodes.

10. The display of claim 9, further comprising a second insulative substrate interposed between the second surface of said member and said plurality of row electrodes.

11. The display of claim 1, further comprising a substantially transparent substrate supporting said plurality of column electrodes.

12. The display of claim 1, wherein said member has a first surface substantially parallel to said second plane; said plurality of rear cell electrodes being spaced a first distance from said member first surface.

13. The display set forth in claim 12, wherein said row electrodes are positioned at said first distance from said member first surface, the single row electrode associated with a row of rear cell electrodes being positioned parallelly adjacent to, coplanar with and between the associated row of rear cell electrodes and a next adjacent row of rear cell electrodes.

14. The display set forth in claim 13, further comprising an insulative substrate supporting all of said coplanar rear cell and row electrodes at said first distance from said first member surface.

15. The display set forth in claim 12, wherein said row electrodes are positioned in a plane at a second distance, less than said first distance, parallel to said member first surface.

16. The display set forth in claim 15, wherein each rear cell electrode has a first dimension in said second direction and each row electrode has a dimension in said second direction less than said first dimension, each said row electrode being positioned between the associated row of rear cell electrodes and said member such that the dimension of the matrix cell in said second direction is determined only by the dimension of said rear cell electrode in said second direction.

17. The display of claim 1, further comprising a plurality of auxiliary electrodes arranged spaced each from the other in said first direction and upon a surface of said member, each auxiliary electrode being in registration with an associated column electrode and in electrical connection therewith.

18. The display of claim 1, wherein the display is formed of a matrix of NxM cells; one of said pluralities of column and row electrodes being comprised of N electrodes, with N being an integer greater than one, and with the N electrodes being sequentially and repetitively energizable with one of the respective column and row driving voltages; the remaining one of the pluralities of column and row electrodes being comprised of M electrodes, where M is a integer greater than one, and with at least one of said M electrodes being energizable simultaneously with each energization of one of the respective column and row driving voltages energizing the N electrodes.

19. The display of claim 18, wherein each of the column and row driving voltages are voltage pulses.

20. The display of claim 19, wherein the driving voltage pulse applied to any one of the N electrodes is present only for 1/N of a time interval required to energize all of said N electrodes in sequence; the capacitance across the optically active material associated with each matrix cell storing energy, during the application of the driving voltage pulse thereto, sufficient to maintain that cell in one of the light-absorbing and light-transmitting conditions, as established responsive to the total magnitude of the column and row driving voltages present during the interval wherein said driving pulse is present, during the remainder of the time interval required for sequentially energizing each of the remaining N-1 electrodes.

21. The display set forth in claim 20, wherein N is between about 100 and about 1000.

22. The display set forth in claim 19, wherein the polarity of the driving voltage pulse is reversed after each repetition of at least N sequential driving pulses.

23. The display of claim 18, wherein the number of column electrodes is equal to the number of row electrodes.

24. The display of claim 1, further comprised of auxiliary means for providing a matrix of one of N and M elements for storing one of the pluralities of column and row driving signals and for providing the stored plurality of signals to the associated ones of the column and row electrodes.

25. The display of claim 24, wherein said auxiliary means comprises a matrix of storage cells with each storage cell comprised of a series-connected combination of a two-terminal non-linear element and a two-terminal capacitive element.

26. The display of claim 25, wherein a remaining terminal of the non-linear element of each auxiliary matrix cell is connected to one of a plurality of scan lines and the remaining terminal of the capacitive element of each auxiliary matrix cell is connected to one of a plurality of data lines; said data and scan lines receiving multiplexed sequential signals defining the energy storage state of the capacitance of each auxiliary matrix cell; the junction between each capacitance and non-linear element of each auxiliary matrix cell being coupled to an associated one of the plurality of said column and row electrodes.

27. The display of claim 24, further comprising a second auxiliary matrix means for providing driving signals sequentially to the remaining one of said column and row electrode pluralities.

28. A multiplexible display, comprising:
a plurality of reflective display cells each comprised of a front electrode;
a reflective rear electrode;
a layer of optically active material positioned between said front and rear electrodes; said layer being switchable between a dark-appearing condition and a bright-appearing condition, responsive to the magnitude of a voltage between the front and rear electrodes of that display cell being respectively less than and at least equal to a preselected voltage magnitude; each display cell being characterized by a predetermined value of electrical capacitance between said front and rear electrodes;
a member of an electrically non-linear resistive material having a plurality of positions defined thereon each forming a passive, non-linear resistive element in correspondence to one of the plurality of display cells; said non-linear material having a preselected break-down voltage below which breakdown voltage substantially no current flows through said material and above which break-down voltage substantial amounts of current can flow therethrough with the voltage drop across the resistance element being substantially equal to said breakdown voltage; each resistive element having an electrical capacitance thereacross less than the predetermined value of electrical capacitance of said display cell;
a plurality of first electrodes, each associated with at least one different one of the display cells;
means for coupling each position on said member of non-linear material between the rear electrode of the display cell associated with that position and that one of the plurality of first electrodes associated with that display cell; and
a plurality of second electrodes, each coupled to at least one different one of the front electrodes of said plurality of display cells, with only one of the display cells coupled to any particular one of the second electrodes having the front electrode thereof coupled to a particular one of the first electrodes;
each display cell appearing respectively dark and bright only if the magnitude of a total driving voltage coupled between the first and second electrodes respectively coupled to the rear and front electrodes of that display cell is, respectively, less than and greater than the sum of the break-down voltage and the preselected voltage magnitude for the optically active material layer.

29. The display of claim 28, wherein the front electrodes are fabricated of a transparent conductive material.

30. The display of claim 29, wherein the material is indium tin oxide.

31. The display of claim 28, wherein said electrically non-linear material is a varistor material.

32. The display of claim 31, wherein the varistor material is comprised of zinc oxide.

33. The display of claim 28, wherein the optically active material is a liquid crystal material.

34. The display of claim 33, wherein the optically active material is a dichroic liquid crystal material.

35. The display of claim 28, including N first electrodes and M second electrodes, where N and M are integers one plurality of the plurities of first and second electrodes being sequentially energized in repetitive manner and the other plurality of the pluralities of first and second electrodes being simultaneously energizable during each energization of each electrode of the remaining electrode plurality.

36. The display of claim 35, further comprising auxiliary means for providing a matrix of one of N and M elements for storing one of the pluralities of first and second electrode energizing signals and for providing the stored plurality of signals to the associated ones of the first and second pluralities of electrodes.

37. The display of claim 36, wherein said auxiliary means comprised of matrix of storage cells with each storage cell comprised of a series-connected combination of a two-terminal non-linear element and a two-terminal capacitive element.

38. The display of claim 37, wherein a remaining terminal of the non-linear element of each auxiliary matrix cell is connected to one of a plurality of scan lines and the remaining terminal of the capacitive element of each auxiliary matrix cell is connected to one of a plurality of data lines; said data and scan lines receiving multiplexed sequential signals defining the energy storage state of the capacitance of each auxiliary matrix cell; the junction between each capacitance and non-linear element of each auxiliary matrix cell being coupled to an associated one of the plurality of said first and second electrodes being energized by said auxiliary means.

39. The display of claim 36, further comprising a second auxiliary matrix means for providing driving signals sequentially to the remaining one of said first and second electrode pluralities.

40. A multiplexible display, comprising:

a plurality of substantially parallel and substantially transparent elongated and continuous column electrodes arranged spaced each from the other in a first direction in a first plane, each of said column electrodes adapted for having a column driving voltage coupled thereto;

a plurality of reflective and substantially flat coplanar rear cell electrodes arranged spaced each from the others and extending in both said first direction and in a second direction, substantially transverse to said first direction, in a second plane parallel to, and spaced behind, said first plane;

a plurality of substantially parallel row electrodes situated in a third plane parallel to, and spaced behind, said second plane, said row electrodes arranged spaced each from the others in said second direction and with only one of the row electrodes positioned substantially parallel to an associated one of said rear cell electrodes, each of said row electrodes adapted for having a row driving voltage coupled thereto;

a layer of optically-active material positioned as the only element between said first and second planes, said layer having a plurality of display cells therein, each defined by the registration of one of said plurality of column electrodes and one of said plurality of rear cell electrodes; the optically-active material in each display cell respectively absorbing therein and transmitting therethrough light entering said display cell responsive to the magnitude of the voltage between the portions of the column and rear cell electrodes defining said display cell being respectively less than and at least equal to a preselected voltage magnitude;

a member of an electrically non-linear resistive material having a plurality of positions defined thereon with each position in correspondence to one of said display cells, said material having a preselected break-down voltage; a voltage across said member below said break-down voltage causing said material to always have a relative high resistance across said member and a voltage across said member above said breakdown voltage causing said material to always have a relatively low resistance across said member;

means for coupling each of said positions of said member between an associated rear cell electrode defining a display cell and a row electrode associated therewith;

each of said display cells absorbing light incident thereon if the magnitude of a total driving voltage coupled between the column and row electrodes defining that display cell is less than the sum of the break-down voltage of the non-linear material and the preselected voltage magnitude for the optically-active material layer; and each of said display cells always reflecting light incident thereon if the magnitude of the total driving voltage coupled between said row and column electrodes defining that display cell is greater than the sum of said break-down voltage and the preselected voltage magnitude of the optically-active material layer.

41. The display of claim 40, wherein said electrically non-linear material is a varistor material.

42. The display of claim 40, wherein the optically-active material is a liquid crystal material.

43. The display of claim 42, wherein the optically-active material is a dichroic liquid crystal material.

44. The display of claim 40, wherein said non-linear material member has opposed first and second surfaces. with the plurality of rear cell electrodes being fabricated adjacent to one of said first and second surfaces of said member and the plurality of row electrodes being fabricated adjacent to the remaining one of the first and second surfaces of said member, and with each of the plurality of rear cell electrodes being in registration with an associated one of the plurality of row electrodes.

* * * * *